(12) United States Patent
Lee et al.

(10) Patent No.: US 9,599,159 B2
(45) Date of Patent: Mar. 21, 2017

(54) NOISE REDUCING STRUCTURE OF SPEED REDUCTION DEVICE FOR ELECTRIC CVVT

(71) Applicant: Hyundai Motor Company, Seoul (KR)

(72) Inventors: Seungwoo Lee, Seoul (KR); Hongkil Baek, Seoul (KR); Bokyung Kim, Yongin-si (KR); Inwoong Lyo, Suwon-si (KR); Jiyoun Seo, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 171 days.

(21) Appl. No.: 14/555,281

(22) Filed: Nov. 26, 2014

(65) Prior Publication Data
US 2015/0308499 A1 Oct. 29, 2015

(30) Foreign Application Priority Data
Apr. 29, 2014 (KR) ........................ 10-2014-0051620

(51) Int. Cl.
| | | |
|---|---|---|
| *F16H 13/08* | (2006.01) | |
| *F16H 1/32* | (2006.01) | |
| *F16C 1/00* | (2006.01) | |
| *F16C 33/32* | (2006.01) | |
| *F16C 33/38* | (2006.01) | |
| *F16C 33/58* | (2006.01) | |
| *F16C 19/50* | (2006.01) | |

(52) U.S. Cl.
CPC ............ *F16C 33/32* (2013.01); *F16C 19/507* (2013.01); *F16C 33/3887* (2013.01); *F16C 33/585* (2013.01); *F16C 2361/91* (2013.01)

(58) Field of Classification Search
CPC .. F16H 13/08; F16H 1/32; F01L 1/026; F01L 1/04; F16C 1/00
See application file for complete search history.

(56) References Cited

U.S. PATENT DOCUMENTS

| | | | | |
|---|---|---|---|---|
| 2,980,987 A | * | 4/1961 | Lamson | .............. F16C 33/6696 29/898.1 |
| 3,001,837 A | * | 9/1961 | Lamson | ................ F16C 33/445 384/463 |
| 3,857,148 A | * | 12/1974 | Hata | ....................... F16C 19/00 29/898.062 |

(Continued)

FOREIGN PATENT DOCUMENTS

| | | |
|---|---|---|
| JP | 7-27138 A | 1/1995 |
| JP | 2005-213397 A | 8/2005 |

(Continued)

*Primary Examiner* — Tisha Lewis
(74) *Attorney, Agent, or Firm* — Morgan, Lewis & Bockius LLP

(57) ABSTRACT

A noise reducing apparatus of a speed reduction device for electric continuous variable valve timing (CVVT), may include the speed reduction device having an inner tooth portion formed to be faced opposing an external wheel of a ball bearing in an interior diameter surface of a housing that may be integrally formed with a sprocket and rollers arranged through a cage between an inner tooth of the inner tooth portion and the external wheel of the ball bearing, wherein a coating layer may be formed to ease impact in exterior circumference portions of the rollers.

10 Claims, 8 Drawing Sheets

(56) References Cited

U.S. PATENT DOCUMENTS 5,284,394 A * 2/1994 Lemelson ............ B23D 61/185
            384/463

FOREIGN PATENT DOCUMENTS

| JP | WO2010004880 A1 * | 1/2010 | ............... F16H 1/32 |
| JP | 2010-159738 A | 7/2010 | |
| JP | 2013-199938 A | 10/2013 | |
| JP | 5376288 B2 | 10/2013 | |
| JP | 2014-31871 A | 2/2014 | |

* cited by examiner

100

NOISE REDUCING STRUCTURE OF SPEED REDUCTION DEVICE FOR ELECTRIC CVVT

CROSS-REFERENCE TO RELATED APPLICATION

The present application claims priority to and the benefit of Korean Patent Application No. 10-2014-0051620 filed on Apr. 29, 2014 the entire contents of which is incorporated herein for all purposes by this reference.

BACKGROUND OF THE INVENTION

Field of the Invention

An exemplary embodiment of the present invention relates to an electric CVVT. More particularly, the present invention relates to a noise reducing structure of a speed reduction device that changes a rotation phase difference with respect to a sprocket by transmitting output shaft rotation of the electric motor to a camshaft.

Description of Related Art

In general, a continuously variable valve timing apparatus (CVVT. continuous variable valve timing, or Camshaft phaser) refers to an apparatus that controls valve operation timing of an engine.

A typical variable timing apparatus usually in a vehicle maker is a vane-type variable valve timing apparatus that occupies a relatively small space and is inexpensive.

However, such a vane-type variable valve timing apparatus cannot provide a prompt and accurate response when an oil pressure is low because an engine of the apparatus uses lubrication oil.

In particular, when the engine is in an idle state, in a high-temperature state, or in a start-up state, that is, when the engine oil pressure is insufficient, a phase of the camshaft cannot be relatively changed and an exhaust gas may be excessively discharged.

To supplement such a drawback, a study on an electric CVVT that can electrically control the valve timing with an electric motor has been activated.

For example, the electric CVVT is formed by arranging a camshaft driving a valve of an engine and a sprocket receiving a rotation force from the engine and rotatably driving the camshaft in a coaxial direction for enabling relative rotation, and may transmit rotation of the electric motor to the camshaft through a speed reduction device.

Such an electric CVVT changes a rotation phase with respect to the sprocket by transmitting rotation of an output shaft of the electric motor to the camshaft through the speed reduction device, and changes opening/closing timing of the engine valve.

Here, in the speed reduction device, an inner tooth portion opposing an external wheel of a ball bearing is provided in an interior diameter surface of a housing that is integrated with the sprocket and a plurality of rollers are arranged between an inner tooth and the external wheel of the ball bearing through a cage.

However, in such a speed reduction device, a backlash exists between the rollers and the cage and between the rollers and the inner tooth so that an excessive noise is generated from impact between the rollers and the cage and between the rollers and the inner tooth due to change in a torque of the camshaft.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a noise reducing unit of a speed reduction device for electric CVVT that can reduce a noise generated from collision between rollers and a cage or between rollers and an inner tooth due to change in a torque of a camshaft caused by a backlash between the rollers and the cage and between the rollers and the inner tooth.

In an aspect of the present invention, noise reducing apparatus of a speed reduction device for electric continuous variable valve timing (CVVT) may include the speed reduction device having an inner tooth portion formed to be faced opposing an external wheel of a ball bearing in an interior diameter surface of a housing that is integrally formed with a sprocket and rollers arranged through a cage between an inner tooth of the inner tooth portion and the external wheel of the ball bearing, wherein a coating layer is formed to ease impact in exterior circumference portions of the rollers.

A pocket that supports the roller is formed in the cage wherein a coating layer that eases impact is formed in an inner surface of the pocket.

The coating layer that eases impact is formed in a roller contact surface of the inner tooth.

A pocket supporting the roller is formed in the cage, wherein a coating layer that eases impact is formed in an inner surface of the pocket and a roller contact surface of the inner tooth.

In another aspect of the present invention, a noise reducing apparatus of a speed reduction device for electric continuous variable valve timing (CVVT) may include the speed reduction device having an inner tooth portion formed to be faced opposing an external wheel of a ball bearing in an interior diameter surface of a housing that is integrally formed with a sprocket and rollers arranged through a cage between an inner tooth of the inner tooth portion and the external wheel of the ball bearing, wherein a pocket supporting the roller is formed in the cage, and a coating layer that eases impact is formed in an inner surface of the pocket and a roller contact surface of the inner tooth.

The coating layer may include a polyamideimide resin and aerogel dispersed in the polyamideimide resin.

The polyamideimide resin exists with a content of approximately 2 wt % or less in the aerogel.

The polyamideimide resin does not exist at a depth corresponding to approximately 5% or more of a longest diameter from a surface of the aerogel.

Each aerogel may have porosity of approximately 92% to approximately 99% while being dispersed in the polyamideimide resin.

The coating layer may have a thickness of approximately 50 μm to approximately 500 μm.

The coating layer may include the aerogel in a content of approximately 5 to approximately 50 parts by weight based on 100 parts by weight of the polyamideimide resin.

According to the exemplary embodiments of the present invention, the coating layer is formed in the exterior circumference portions of the rollers, the inner surface of the pocket, and the roller contact surface of the inner tooth, and thus when the rollers collide the cage or the inner tooth due to change in the torque of the camshaft without regard to the backlash between the roller and the cage and the backlash between the roller and the inner tooth, impact from the collision can be absorbed and eased through the coating layer, thereby reducing impact noise.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
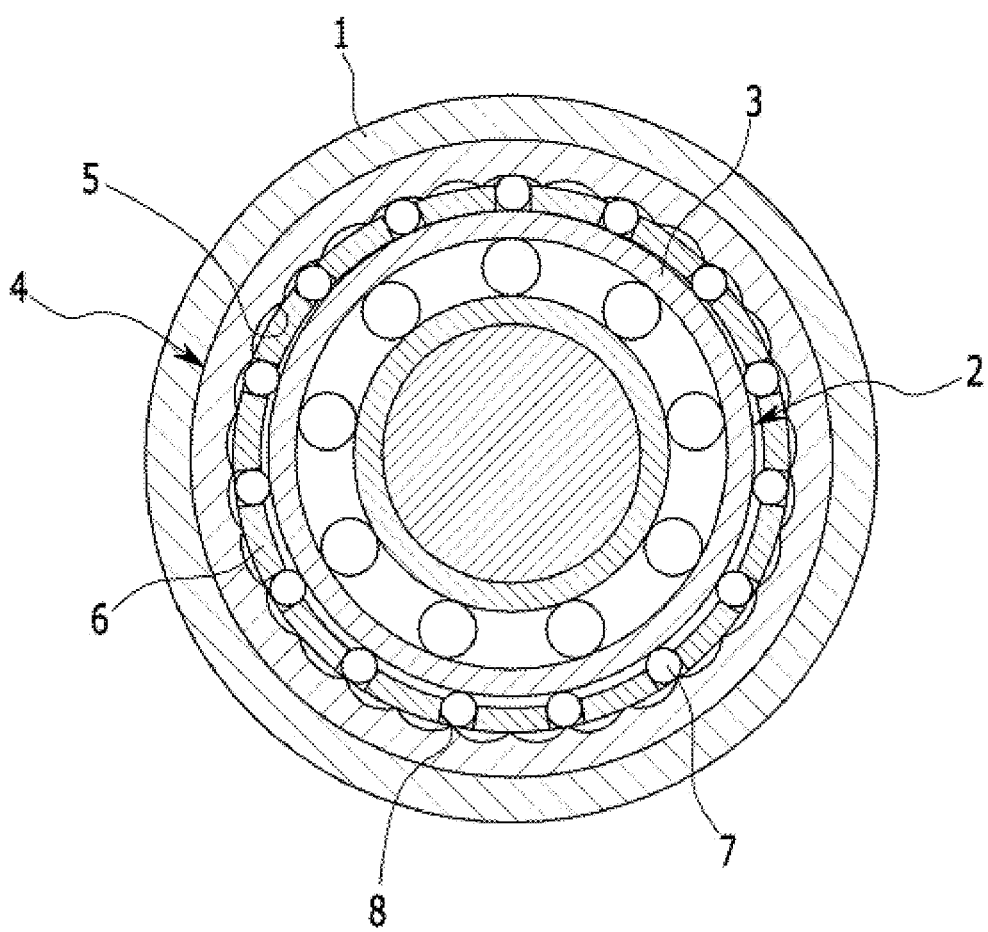
FIG. 1 shows an electric CVVT for a speed reduction device to which a noise reducing unit according to an exemplary embodiment of the present invention is applied.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

The sizes and thicknesses of the configurations shown in the drawings are provided selectively for the convenience of description, such that the present invention is not limited to those shown in the drawings, and the thicknesses are exaggerated to make some parts and regions more clear.

In addition, some of the components are called a first, a second, etc., throughout the detailed descriptions in an effort to distinguish such components from one another because they have the same configurations, but in the following description, such a sequence is not limiting.

In addition, unless explicitly described to the contrary, the word "comprise" and variations such as "comprises" or "comprising", will be understood to imply the inclusion of stated elements but not the exclusion of any other elements.

In addition, the terms "-unit", "-means", "-er", and "-member" described in the specification mean units for processing at least one function and operation.

FIG. 1 illustrates a speed reduction device for electric CVVT to which a noise reducing unit according to an exemplary embodiment of the present invention is applied.

Referring to FIG. 1, a noise reducing unit according to an exemplary embodiment of the present invention may be applied to an electric continuous variable valve timing (CVVT) that can electrically control valve timing an engine with an electric motor.

For example, the electric CVVT may be formed by arranging a camshaft driving the valve of the engine and a sprocket receiving a rotation force from the engine and rotatably driving the camshaft on the same shaft for enabling relative rotation, and may transmit rotation of the electric motor to the camshaft through a speed reduction device 100.

Thus, the electric CVVT changes a rotation phase with respect to the sprocket by transmitting rotation of an output shaft of the electric motor to the camshaft through the speed reduction device 100, and changes opening/closing timing of the engine valve.

Here, the speed reduction device 100 according to the exemplary embodiment of the present invention may include an inner tooth portion 4 formed in an interior diameter surface of a housing 1 that is integrally formed with a sprocket and a plurality of rollers 7 arranged between an inner tooth 5 of the inner tooth portion 4 and an external wheel 3 of a ball bearing 2 through a cage 6.

In this case, the inner tooth 5 of the inner tooth portion 4 forms a rounded roller contact surface to which the roller 7 contacts by rolling, and a pocket 8 is formed as a space for supporting the rollers 7 in the cage 6.

Such a speed reduction device 100 for the electric CVVT has been disclosed in the prior art stated in the Background section, and therefore no further description will be provided.

The noise reducing unit according to the exemplary embodiment of the present invention has a structure in which a noise generated from collision of the rollers 7 to the cage 6 or the inner tooth 5 due to change in torque of the camshaft that is caused by a backlash between the rollers 7 and the cage 6 and a backlash between the rollers 7 and the inner tooth 5 can be reduced during operation of the speed reduction device 100 of the electric CVVT.

FIG. 2 to FIG. 6 illustrate the noise reducing unit of the electric CVVT speed reduction device according to the exemplary embodiment of the present invention.

Figure 2:
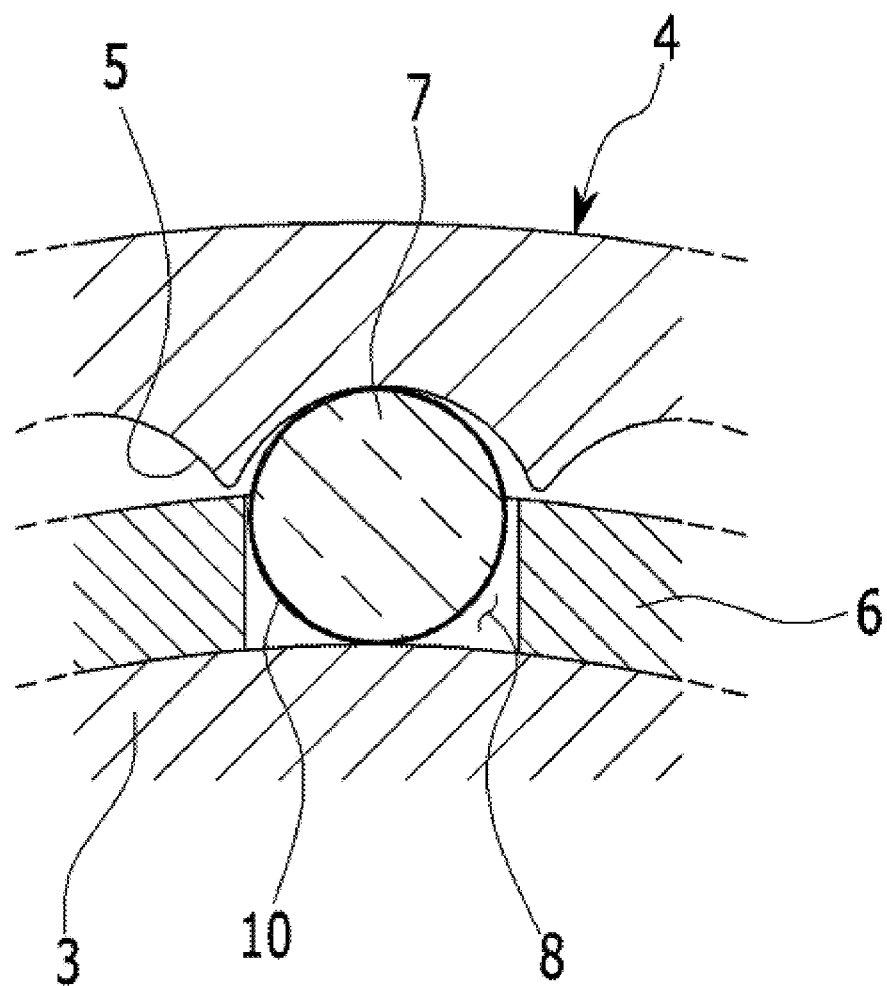
FIG. 2, FIG. 3, FIG. 4, FIG. 5, and FIG. 6 are the noise reducing unit of the speed reduction device for the electric CVVT according to the exemplary embodiment of the present invention.

Referring to FIG. 2, the noise reducing unit of the electric CVVT speed reduction device according to the exemplary embodiment of the present invention forms a coating layer 10 that eases impact in external circumferences of the rollers 7.

In the exemplary embodiment of the present invention, the coating layer 10 may be coated to the entire external circumferences of the rollers 7 that contact an inner surface of the pocket 8 and a roller contact surface of the inner tooth 5 due to the backlash between the roller 7 and the cage 6 and the gate between the roller 7 and the inner tooth 5.

That is, the roller 7 may collide the cage 6 or the inner tooth 5 due to change in the torque of the camshaft without regard to the backlashes between the roller 7 and the cage 6 and between the roller 7 and the inner tooth 5, and the coating layer 7 absorbs and eases the impact from the collision to thereby reduce a noised from the impact.

Figure 3:
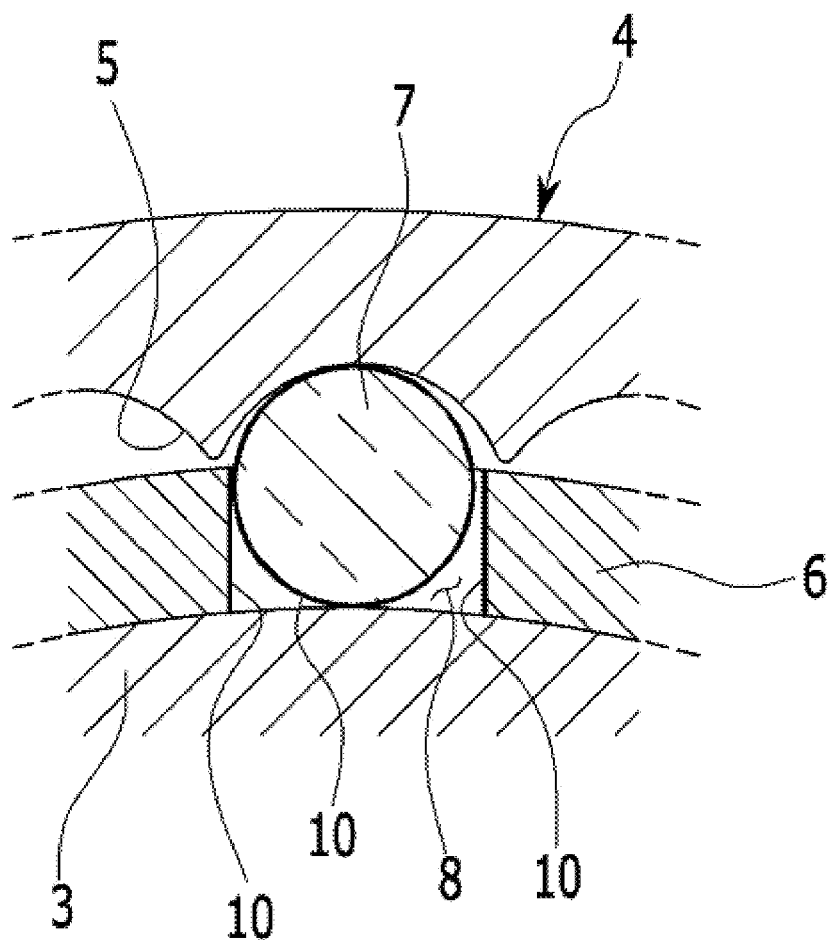

Referring to FIG. 3, as a first exemplary variation, the noise reducing unit of the electric CVVT speed reduction device according to the exemplary embodiment of the present invention may form a coating layer 10 in external circumferences of the rollers 7 and an inner surface of the pocket 8 to ease impact.

The roller 7 may collide the cage 6 or the inner tooth 5 due to change in the torque of the camshaft without regard to the backlashes between the roller 7 and the cage 6 and between the roller 7 and the inner tooth 5, and the coating layer 10 may be coated to the external circumferences of the rollers 7 and the inner surface of the pocket 8 to reduce a noise from the impact while absorbing and easing the impact.

Figure 4:
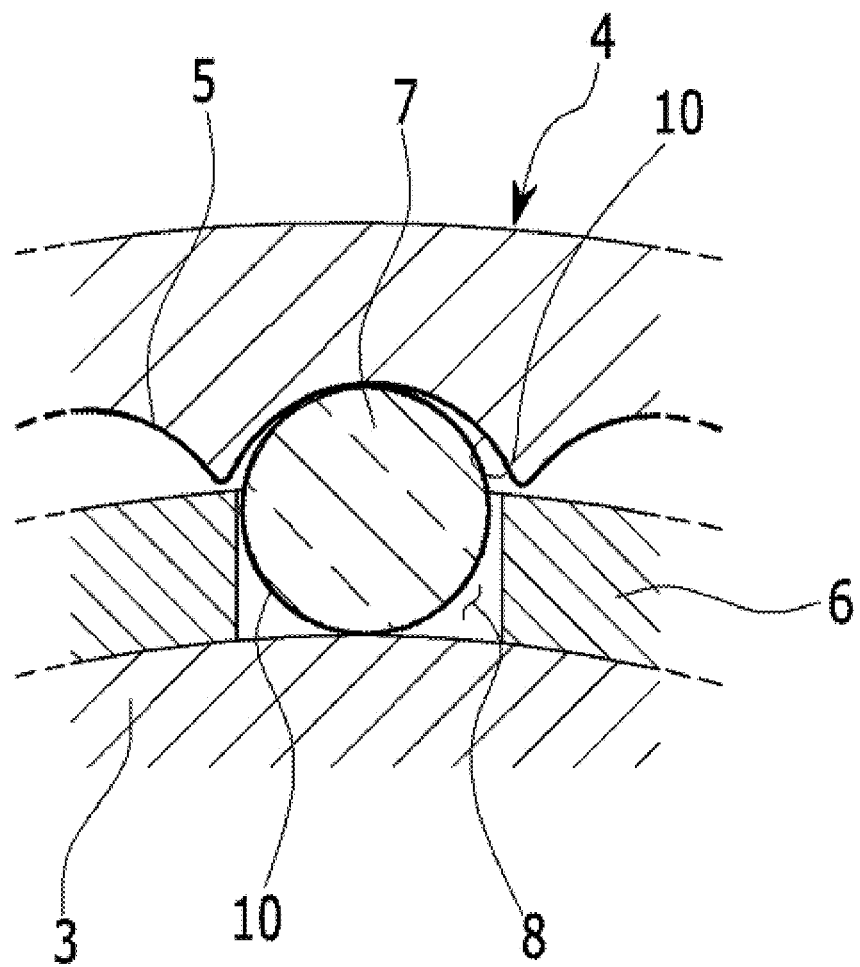

Referring to FIG. 4, the coating layer 10 that eases impact may be formed in external circumferences of the rollers 7 and a roller contact surface of the inner tooth 5 in the noise reducing unit of the electric CVVT speed reduction device according to a second exemplary variation of the exemplary embodiment of the present invention.

The roller 7 may collide the cage 6 or the inner tooth 5 due to change in the torque of the camshaft without regard to the backlashes between the roller 7 and the cage 6 and between the roller 7 and the inner tooth 5, and the coating layer 10 may be coated to the external circumferences of the rollers 7 and the roller contact surface of the inner tooth 5.

Figure 5:
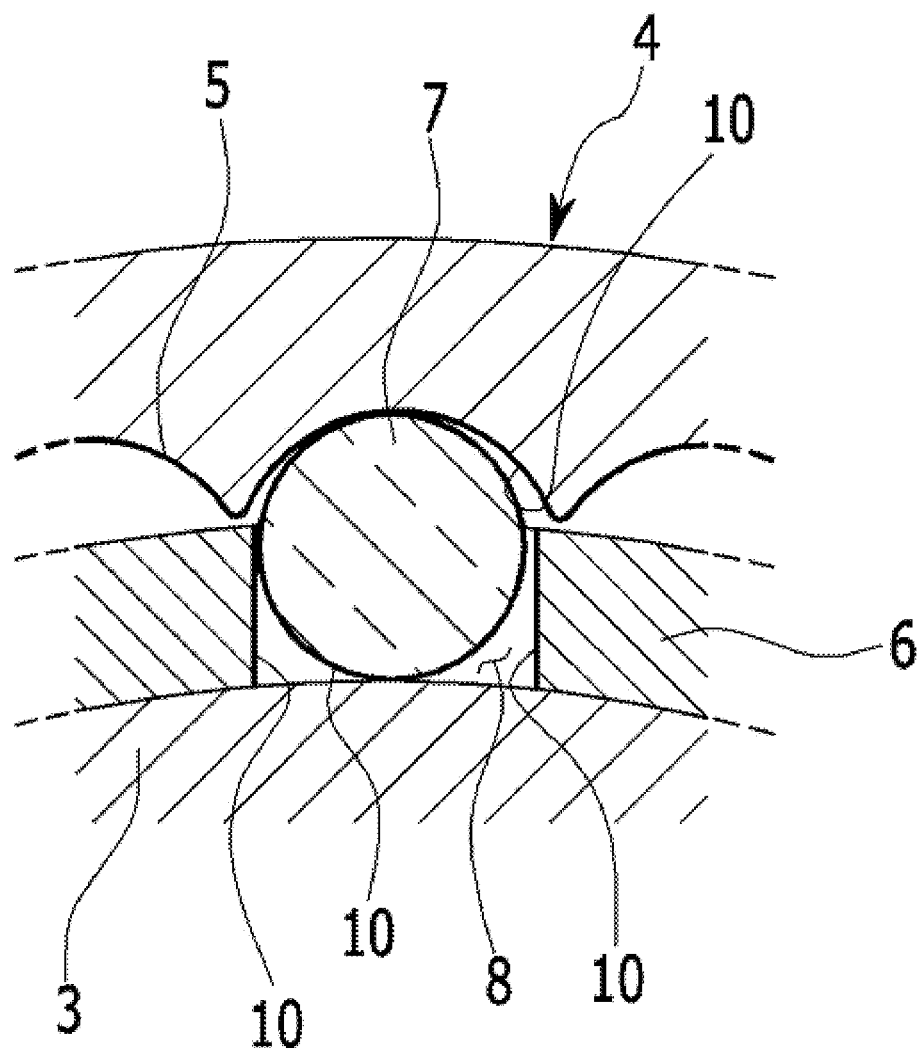

Referring to FIG. 5, the coating layer 10 that eases impact may be formed in external circumferences of the rollers 7, an inner surface of the pocket 8, and a roller contact surface of the inner tooth 5 in the noise reducing unit of the electric CVVT speed reduction device according to a third exemplary variation of the exemplary embodiment of the present invention.

The roller 7 may collide the cage 6 or the inner tooth 5 due to change in the torque of the camshaft without regard to the backlashes between the roller 7 and the cage 6 and between the roller 7 and the inner tooth 5, and the coating layer 10 may be coated to the external circumferences of the rollers 7, the inner surface of the pocket 8, and the roller contact surface of the inner tooth 5.

Figure 6:
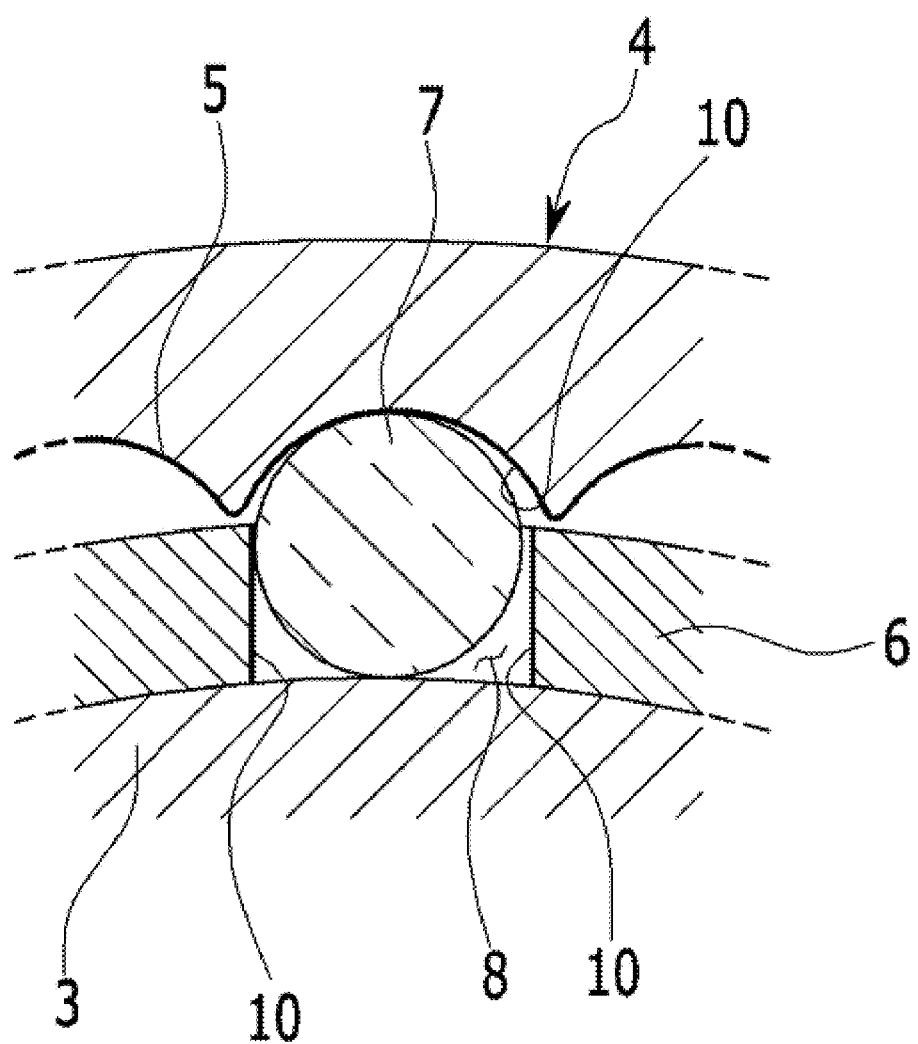

Referring to FIG. 6, the coating layer 10 that eases impact may be formed in a portion an inner side surface of the pocket, directly colliding the rollers 7 and a roller contact surface of the inner tooth in the noise reducing unit of the electric CVVT speed reduction device according to a fourth exemplary variation of the exemplary embodiment of the present invention.

The roller 7 may collide the cage 6 or the inner tooth 5 due to change in the torque of the camshaft without regard to the backlashes between the roller 7 and the cage 6 and between the roller 7 and the inner tooth 5, and the coating layer 10 may be coated to the inner side surface of the pocket 8, excluding the rollers 7, and the roller contact surface of the inner tooth 5.

Hereinafter, the noise reducing coating layer 10 applied to the noise reducing unit of the electric CVVT speed reduction device according to the exemplary embodiment of the present invention, and a coating composition thereof will be described in more detail.

In the exemplary embodiment of the present invention, as a noise reducing coating layer, a coating composition including a polyamideimide resin dispersed in a high boiling point organic solvent or an aqueous solvent and an aerogel dispersed in a low boiling point organic solvent is provided.

In addition, the noise reducing coating layer according to the exemplary embodiment of the present invention includes a polyamideimide resin and an aerogel dispersed in the polyamideimide resin.

According to the specific exemplary embodiment of the present invention, the coating composition including the polyamideimide resin dispersed in the high boiling point organic solvent or the aqueous solvent and the aerogel dispersed in the low boiling point organic solvent may be provided.

The present inventors confirmed through an experiment that the coating composition obtained by dispersing the polyamideimide resin and the aerogel in predetermined solvents, respectively, and then mixing the resultant solutions, and the coating layer obtained therefrom could secure high mechanical properties and durability, and was applied to a portion where an impact noise is generated to absorb and reduce the impact noise.

Recently, methods of using the aerogel (or air-gel) have been introduced in fields such as an adiabatic material, an impact absorber, or a soundproofing material. This aerogel has a structure in which microfilaments having a thickness that is a ten-thousandth of that of hair are entangled, and has porosity of 90% or more, and main materials thereof are silicon oxide, carbon, or an organic polymer.

since the aerogel is easily broken even by small impact due to high brittleness to exhibit very poor strength and it is difficult to process the aerogel to have various thicknesses and shapes, in the case where the aerogel and the other reactants are mixed, there are problems in that since a solvent or a solute permeates an inside of the aerogel to increase viscosity of a compound and thus make mixing unfeasible, it is difficult to perform complexation of the aerogel with the other material or mix the aerogel with the other material, and a characteristic of the porous aerogel is not exhibited.

On the other hand, in the coating composition of the exemplary embodiment, the polyamideimide resin exists while being dispersed in the high boiling point organic solvent or aqueous solvent and the aerogel exists while being dispersed in the low boiling point organic solvent, and thus a solvent dispersion phase of the polyamideimide resin and a solvent dispersion phase of the aerogel do not agglomerate but may be uniformly mixed, and the coating composition may also have a homogeneous composition.

Moreover, since the high boiling point organic solvent or aqueous solvent and the low boiling point organic solvent are not easily mutually dissolved or mixed, the polyamideimide resin and the aerogel are mixed while the polyamideimide resin is dispersed in the high boiling point organic solvent or aqueous solvent and the aerogel is dispersed in the low boiling point organic solvent, to form the coating composition, and thus direct contact between the polyamideimide resin and the aerogel may be minimized before the coating composition of the exemplary embodiment is applied and dried, and the polyamideimide resin may be prevented from permeating the inside of the aerogel or the pore or being impregnated in the aerogel or the pore.

Further, since the low boiling point organic solvent has predetermined affinity with the high boiling point organic solvent or aqueous solvent, the low boiling point organic solvent may serve to materially mix the aerogel dispersed in the low boiling point organic solvent and the polyamideimide resin dispersed in the high boiling point organic solvent or aqueous solvent and thus uniformly distribute the aerogel and uniformly distribute the polyamideimide resin in the high boiling point organic solvent or aqueous solvent.

Accordingly, in the coating layer obtained from the coating composition of the exemplary embodiment, physical properties of the aerogel may be secured at the same level or more, and the aerogel may be more uniformly dispersed in the polyamideimide resin to implement high mechanical properties and durability.

That is, as described above, in the coating layer obtained from the coating composition of the exemplary embodiment, since the physical properties and the structure of the aerogel may be maintained at the same level, the coating layer may secure high mechanical properties and durability, and is applied to a portion where an impact noise is generated to absorb and reduce the impact noise.

Here, as shown in FIG. 2 to FIG. 6, the coating layer 10 may be applied to the external circumferences of the rollers 7, the inner side surface of the pocket 8, and the roller contact surface of the inner tooth 5 in the electric CVVT speed reduction device.

Meanwhile, the coating composition of the exemplary embodiment may be formed by mixing the polyamideimide resin dispersed in the high boiling point organic solvent or aqueous solvent and the aerogel dispersed in the low boiling point organic solvent as described above.

The mixing method is not largely limited, and any typically known physical mixing method may be used. For example, there is a method of manufacturing a coating composition (coating solution) by mixing two kinds of solvent dispersion phases, adding a zirconia bead thereto, and performing ball milling under a condition of a temperature of room temperature and normal pressure at a speed of 100 to 500 rpm. However, the method of mixing the solvent dispersion phases of the polyamideimide resin and the aerogel is not limited to the aforementioned example.

The coating composition of the exemplary embodiment may provide the adiabatic material, an adiabatic structure, and the like, which may be maintained over a long period of time in the internal combustion engine to which a repeated high temperature and high pressure condition is applied, and specifically, the coating composition of the exemplary embodiment may be used in coating of an internal surface of the internal combustion engine or parts of the internal combustion engine, and further, as described, may be used in noise reducing of parts of the electric CVVT speed reduction device where the impact noise is generated.

An example of the polyamideimide resin, which may be included in the coating composition of the exemplary embodiment, is not largely limited, but the polyamideimide resin may have a weight average molecular weight of 3,000 to 300,000, or 4,000 to 100,000.

If the weight average molecular weight of the polyamideimide resin is very small, it may be difficult to sufficiently secure mechanical properties or durability of a coating layer, a coating film, or a coating membrane obtained from the coating composition, and a polymer resin may easily permeate the inside of the aerogel.

Further, if the weight average molecular weight of the polyamideimide resin is very large, uniformity or homogeneity of the coating layer, the coating film, or the coating membrane obtained from the coating composition may deteriorate, dispersibility of the aerogel in the coating composition may be reduced or a nozzle and the like of a coating device may be clogged when the coating composition is applied, a heat-treating time of the coating composition may be prolonged, and a heat-treating temperature may be increased.

A typical aerogel known in the art may be used as the aforementioned aerogel, and specifically, the aerogel of components including silicon oxide, carbon, polyimide, metal carbide, or a mixture of two or more kinds thereof may be used. The aerogel may have a specific surface area of 100 cm3/g to 1,000 cm3/g, or 300 cm3/g to 900 cm3/g.

The coating composition may include the aerogel in a content of 5 to 50 parts by weight or 10 to 45 parts by weight based on 100 parts by weight of the polyamideimide resin. A weight ratio of the polyamideimide resin and the aerogel is a weight ratio of solids other than the dispersion solvent.

If the content of the aerogel based on the polyamideimide resin is very small, it may be difficult to reduce thermal conductivity and density of the coating layer, the coating film, or the coating membrane obtained from the coating composition in an adiabatic material or an adiabatic structure as previously described, it may be difficult to secure a sufficient adiabatic property, and heat resistance of the coating layer manufactured from the coating composition may be reduced.

Further, if the content of the aerogel based on the polymer resin is very large, it may be difficult to sufficiently secure mechanical properties of the coating layer, the coating film, and the coating membrane obtained from the coating composition, cracks may be generated in a coating layer manufactured from the coating composition, or it may be difficult to maintain a strong coating form of the coating layer.

The solid content of the polyamideimide resin of the high boiling point organic solvent or aqueous solvent is not largely limited, but the solid content may be 5 wt % to 75 wt % in consideration of uniformity or physical properties of the coating composition.

Further, the solid content of the aerogel of the low boiling point organic solvent is not largely limited, but the solid content may be 5 wt % to 75 wt % in consideration of uniformity or physical properties of the coating composition.

As described above, since the high boiling point organic solvent or aqueous solvent and the low boiling point organic solvent are not easily mutually dissolved or mixed, direct contact between the polyamideimide resin and the aerogel may be minimized until the coating composition of the exemplary embodiment is applied and dried, and the polyamideimide resin may be prevented from permeating the inside of the aerogel or the pore or being impregnated in the aerogel or the pore.

Specifically, a boiling point difference between the high boiling point organic solvent and the low boiling point organic solvent may be 10° C. or more, 20° C. or more, or 10 to 200° C. As the high boiling point organic solvent, an organic solvent having the boiling point of 110° C. or more may be used.

Specific examples of the high boiling point solvent may include anisole, toluene, xylene, methyl ethyl ketone, methyl isobutyl ketone, ethyleneglycol monomethylether, ethyleneglycol monoethylether, ethyleneglycol monobutylether, butyl acetate, cyclohexanone, ethyleneglycol monoethylether acetate (BCA), benzene, hexane, DMSO, N,N'-dimethylformamide, or a mixture of two or more kinds thereof.

As the low boiling point organic solvent, an organic solvent having the boiling point of less than 110° C. may be used.

Specific examples of the low boiling point organic solvent may include methyl alcohol, ethyl alcohol, propyl alcohol, n-butyl alcohol, iso-butyl alcohol, tert-butyl alcohol, acetone, methylene chloride, ethylene acetate, isopropyl alcohol, or a mixture of two or more kinds thereof.

Meanwhile, specific examples of the aqueous solvent may include water, methanol, ethanol, ethyl acetate, or a mixture of two or more kinds thereof.

The present inventors manufactured the coating layer which could have high mechanical properties and durability using the aforementioned coating composition according to the exemplary embodiments, and be applied to parts of the speed reduction device of the electrode CVVT where an impact noise is generated to reduce the impact noise.

In the coating layer, the aerogel is uniformly dispersed over an entire region of the polyamideimide resin, and thus physical properties implemented from the aerogel, for example, impact buffer or soundproof properties may be more easily secured, low thermal conductivity and low density may be more easily secured, and a characteristic revealed from the polyamideimide resin, for example, high mechanical properties, durability, and the like, may be implemented at the same level as the case where only the polyamideimide resin is used or more.

The coating layer may have low thermal conductivity and the high thermal capacity, and specifically, the coating layer may have thermal conductivity of 0.60 W/m or less, 0.55 W/m or less, or 0.60 W/m to 0.200 W/m, and the coating layer may have the thermal capacity of 1250 KJ/m3 K or less or 1000 to 1250 KJ/m3 K.

Meanwhile, as described above, since the coating composition of the exemplary embodiment includes the polyamideimide resin dispersed in the high boiling point organic solvent or aqueous solvent and the aerogel dispersed in the low boiling point organic solvent, direct contact between the polyamideimide resin and the aerogel may be minimized until the coating composition is applied and dried, and thus the polyamideimide resin may not permeate the inside of the aerogel or the pore or not be impregnated in the aerogel or the pore included in the finally manufactured coating layer.

Specifically, the polyamideimide resin may not substantially exist in the aerogel dispersed in the polyamideimide resin, and for example, the polyamideimide resin may exist in a content of 2 wt % or less or 1 wt % or less in the aerogel.

Further, in the coating layer, the aerogel may exist while being dispersed in the polyamideimide resin, and in this case, the outside of the aerogel may be in contact with or combined with the polyamideimide resin, but the polyamideimide resin may not exist in the aerogel. Specifically, the polyamideimide resin may not exist at a depth corresponding to 5% or more of a longest diameter from a surface of the aerogel included in the coating layer.

Since the polyamideimide resin does not permeate the inside of the aerogel or the pore or is not impregnated in the aerogel or the pore, the aerogel may have the same level of porosity before and after the aerogel is dispersed in the polyamideimide resin, and specifically, each aerogel included in the coating layer may have porosity of 92% to 99% while being dispersed in the polyamideimide resin.

The coating layer of the exemplary embodiment may provide an adiabatic material, an adiabatic structure, and the like which may be maintained over a long period of time in the internal combustion engine to which a repeated high temperature and high pressure condition is applied, and specifically, the coating layer of the exemplary embodiment may be applied for noise reduction to an internal surface of the internal combustion engine or parts of the internal combustion engine, and parts of the speed reduction device of the electric CVVT where an impact noise is generated.

A thickness of the coating layer of the exemplary embodiment may be determined according to an application field or position, or required physical properties, and for example, may be 50 μm to 500 μm.

The coating layer of the exemplary embodiment may include the aerogel in a content of 5 to 50 parts by weight or 10 to 45 parts by weight based on 100 parts by weight of the polyamideimide resin.

If the content of the aerogel based on the polyamideimide resin is very small, it may be difficult to reduce thermal conductivity and density of the coating layer, it may be difficult to secure a sufficient adiabatic property, and heat resistance of the coating layer may be reduced.

Further, if the content of the aerogel based on the polymer resin is very large, it may be difficult to sufficiently secure mechanical properties of the coating layer, cracks of the coating layer may be generated, or it may be difficult to maintain a strong coat form of the coating layer.

The polyamideimide resin may have a weight average molecular weight of 3,000 to 300,000 or 4,000 to 100,000.

The aerogel may include one or more kinds of compounds selected from the group consisting of silicon oxide, carbon, polyimide, and metal carbide.

The aerogel may have a specific surface area of 100 cm3/g to 1,000 cm3/g.

A specific content of the polyamideimide resin and the aerogel includes the aforementioned content of the coating composition of the exemplary embodiment.

Meanwhile, the coating layer of the exemplary embodiment may be obtained by drying the coating composition of the exemplary embodiment. A device or a method, which may be used in drying the coating composition of the exemplary embodiment, is not largely limited, and a spontaneous drying method at a temperature of room temperature or more, a drying method of heating to a temperature of 50° C. or more, or the like may be used.

For example, the coating composition of the exemplary embodiment may be applied on a coating target, for example, an external surface of a part of the speed reduction device of the electric CVVT, and semi-dried at a temperature of 50° C. to 200° C. one or more times, and the semi-dried coating composition may be completely dried at a temperature of 200° C. or more to form the coating layer. However, a specific manufacturing method of the coating layer of the exemplary embodiment is not limited thereto.

The present invention will be described in more detail in the following examples. However, the following exemplary embodiments are set forth to illustrate the present invention, but the content of the present invention is not limited by the following exemplary embodiments.

[Exemplary Embodiments 1 to 3]

Manufacturing of Coating Composition

The porous silica aerogel (specific surface area, about 500 cm3/g) dispersed in ethyl alcohol and the polyamideimide resin (products manufactured by Solvay SA, weight average molecular weight, about 11,000) dispersed in xylene were injected into the 20 g reactor, the zirconia bead was added thereto (440 g), and ball milling was performed under the room temperature and normal pressure condition at the speed of 150 to 300 rpm to manufacture the coating composition (coating solution).

Forming of Coating Layer

The obtained coating composition was applied on an external circumference of a part for the speed reduction device of the electric CVVT by a spray coating method. In addition, the coating composition was applied on the part, primary semi-drying was performed at about 150° C. for about 10 minutes, the coating composition was re-applied, and secondary semi-drying was performed at about 150° C. for about 10 minutes. After the secondary semi-drying, the coating composition was applied again, and complete drying was performed at about 250° C. for about 60 minutes to form the coating layer on the part.

COMPARATIVE EXAMPLE 1

The solution (PAI solution) of the polyamideimide resin (products manufactured by Solvay SA, weight average molecular weight, about 11,000) dispersed in xylene was applied on an external circumference of a part for the speed reduction device of the electric CVVT by the spray coating method.

In addition, the PAI solution was applied on the part, primary semi-drying was performed at about 150° C. for about 10 minutes, the PAI solution was re-applied, and secondary semi-drying was performed at about 150° C. for about 10 minutes. After the secondary semi-drying, the PAI solution was applied again, and complete drying was performed at about 250° C. for about 60 minutes to form the coating layer on the part.

COMPARATIVE EXAMPLE 2

Manufacturing of Coating Composition

The porous silica aerogel (specific surface area, about 500 cm3/g) and the polyamideimide resin (products manufactured by Solvay SA, weight average molecular weight, about 11,000) dispersed in xylene were injected into the 20 g reactor, the zirconia bead was added thereto (440 g), and ball milling was performed under the room temperature and normal pressure condition at the speed of 150 to 300 rpm to manufacture the coating composition (coating solution).

Forming of Coating Layer

The coating layer having the thickness of about 200 μm was formed by the same method as Exemplary Embodiment 1.

Figure 7:
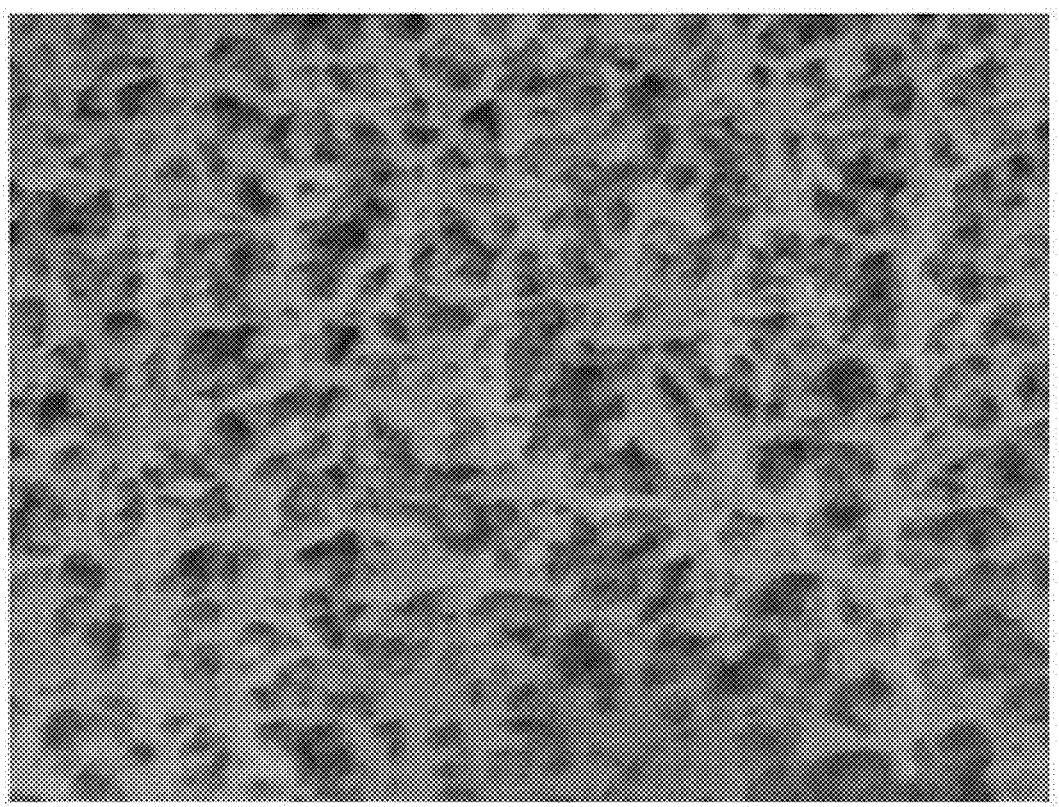
FIG. 7 is a photograph illustrating a surface of a coating layer according to the exemplary embodiment of the present invention.

Thus, as illustrated in FIG. 7, it can be confirmed that in the coating layer manufactured in Exemplary Embodiment 1, the polyamideimide resin does not permeate the inside of the aerogel and almost 92% or more of the pores in the aerogel are maintained.

Figure 8:
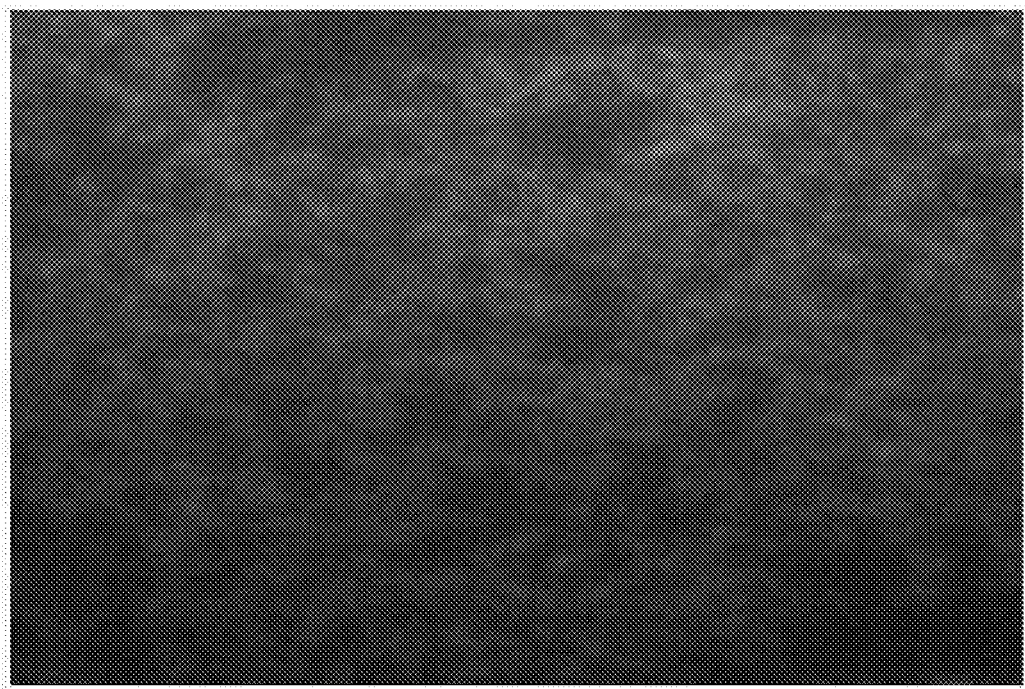
FIG. 8 is a photograph illustrating a surface of a coating layer according to a comparative example of the present invention.

On the other hand, in the coating layer manufactured in Comparative Example 2, as illustrated in FIG. 8, the polyamideimide resin permeated the inside of the aerogel, and thus the pores were hardly observed.

In the above-described noise reducing unit of the speed reduction device for the electric CVVT, the coating layer 10 can have high mechanical properties and durability by including the polyamideimide and the aerogel dispersed in the polyamideimide resin is formed in the exterior circumference portions of the rollers 7, the inner surface of the pocket 8, and the roller contact surfaces of the inner tooth 5.

Thus, in the exemplary embodiment of the present invention, when the rollers 7 collide the cage 6 or the inner tooth 5 due to change in the torque of the camshaft without regard to backlashes between the roller 7 and the cage 6 and between the roller 7 and the inner tooth 5, impact from the collision is absorbed and eased through the coating layer 10 so that an impact noise can be reduced.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A noise reducing apparatus of a speed reduction device for electric continuous variable valve timing (CVVT), the speed reduction device comprising:
    an inner tooth portion formed to be faced opposing an external wheel of a ball bearing in an interior diameter surface of a housing that is integrally formed with a sprocket and rollers arranged through a cage between an inner tooth of the inner tooth portion and the external wheel of the ball bearing,
    wherein a coating layer is formed to ease impact in exterior circumference portions of the rollers, and
    wherein the coating layer comprises a polyamideimide resin and aerogel dispersed in the polvamideimide resin.

2. The noise reducing apparatus of the speed reduction device for the CVVT of claim 1,
    wherein a pocket that supports the roller is formed in the cage and
    wherein a coating layer that eases impact is formed in an inner surface of the pocket.

3. The noise reducing apparatus of the speed reduction device for the CVVT of claim 1, wherein the coating layer that eases impact is formed in a roller contact surface of the inner tooth.

4. The noise reducing apparatus of the speed reduction device for the CVVT of claim 1,
    wherein a pocket supporting the roller is formed in the cage, and
    wherein a coating layer that eases impact is formed in an inner surface of the pocket and a roller contact surface of the inner tooth.

5. A noise reducing apparatus of a speed reduction device for electric continuous variable valve timing (CVVT), the speed reduction device comprising:
    an inner tooth portion formed to be faced opposing an external wheel of a ball bearing in an interior diameter surface of a housing that is integrally formed with a sprocket and rollers arranged through a cage between an inner tooth of the inner tooth portion and the external wheel of the ball bearing,
    wherein a pocket supporting the roller is formed in the cage, and a coating layer that eases impact is formed in an inner surface of the pocket and a roller contact surface of the inner tooth, and
    wherein the coating layer comprises a polvamideimide resin and aerogel dispersed in the polyamideimide resin.

6. The noise reducing apparatus of claim 5, wherein the polyamideimide resin exists with a content of approximately 2 wt % or less in the aerogel.

7. The noise reducing apparatus of claim 5, wherein the polyamideimide resin does not exist at a depth corresponding to approximately 5% or more of a longest diameter from a surface of the aerogel.

8. The noise reducing apparatus of claim 5, wherein each aerogel has porosity of approximately 92% to approximately 99% while being dispersed in the polyamideimide resin.

9. The noise reducing apparatus of claim 5, wherein the coating layer has a thickness of approximately 50μm to approximately 500μm.

10. The noise reducing apparatus of claim 5, wherein the coating layer includes the aerogel in a content of approximately 5 to approximately 50 parts by weight based on 100 parts by weight of the polyamideimide resin.

* * * * *